No. 875,037. PATENTED DEC. 31, 1907.
H. ARON.
COUNTING MECHANISM.
APPLICATION FILED MAY 27, 1904.

WITNESSES.

INVENTOR.
His ATTORNEY.

UNITED STATES PATENT OFFICE.

HERMANN ARON, OF CHARLOTTENBURG, GERMANY.

COUNTING MECHANISM.

No. 875,037.  Specification of Letters Patent.  Patented Dec. 31, 1907.

Application filed May 27, 1904. Serial No. 210,023.

*To all whom it may concern:*

Be it known that I, HERMANN ARON, a citizen of the Empire of Germany, residing at Charlottenburg, 39 Wilmersdorferstrasse, in the Kingdom of Prussia and Empire of Germany, have invented certain new and useful Improvements in Counting Mechanism, of which the following is a specification.

This invention relates to an improvement in that class of registering devices for electric and other meters and instruments of similar nature involving the employment of a train of mechanism certain members of which are provided with indicating devices coöperating in their several individual positions to indicate the effect upon the instrument of the matter or force to be measured. In many of such instruments as heretofore constructed, the several members of the mechanism have been connected in continuous driving relation coöperating with each of the indicating devices, moving with the other or others. The present improvement belongs to that class of such mechanism in which each of the members moves intermittently to record a whole unit or fraction thereof of the denomination which its respective indicating device is designed to register.

The present invention has for its object to provide a simple and effective means whereby the driving member of a train of indicating mechanism is adapted to impart to the adjacent normally-stationary member a quick rotation to advance the next member a distance corresponding to one unit of the denomination which it is designed to register; and it consists primarily in a continuously-rotating driving member, an independently-mounted driven member and an interposed resilient connection, means for temporarily detaining the driven member while the driving member continues to move, and means carried by the driving member for disengaging the detaining means to permit the driven member to overtake the driving member, a connection being provided intermediate the driven member and an adjacent recording member of the train of mechanism whereby each operative movement of the former communicates to the latter a movement corresponding with one unit of measurement.

The invention will be understood by reference to the drawings annexed, in which

Figure 1:
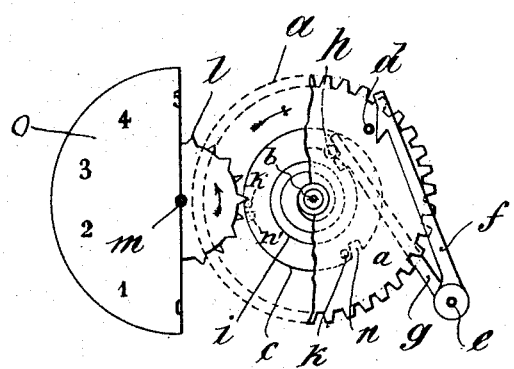
Figure 2:
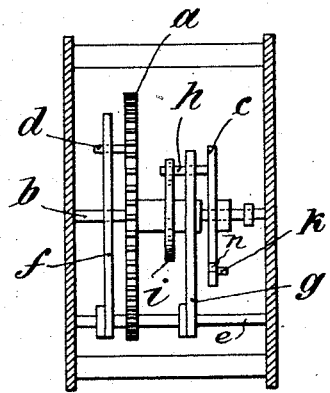

Figure 1 is a front view of a part of a measuring instrument embodying the present improvement, the left-hand part of the toothed driving wheel and the right-hand part of the numbered indicating disk being removed to expose the parts rearward of the same; and Fig. 2 is a transverse section of such mechanism and the frame inclosing the same, with the indicating disk and the member controlling the same omitted.

In practice, a measuring instrument of the class described is usually provided in its front side with a face-plate having a series of spaced openings behind which are disposed a series of numbered dial-plates moved at different rates of speed and each exposing one of its numbers behind the opening in said face-plate; but as the present improvement relates merely to the means of operating the dial-plates by a step-by-step movement, only one of such dial-plates with the rigidly-connected toothed wheel for imparting such movements to it is herein represented, the face-plate through which the figures of the dial-plate are successively exposed being omitted.

As represented herein, the instrument is provided with a toothed wheel $a$ adapted to receive by any suitable means a continuous rotary motion derived from the substance or force to be measured, such wheel being fixed upon the spindle $b$ carrying loosely mounted thereon a wheel $c$ which is connected with the hub of the wheel $a$ by means of a spiral spring $i$ connected at one end to the latter and at the other end to a laterally-projecting pin $h$ carried by the wheel $c$. The wheel $c$ is normally prevented from rotation with the wheel $a$ by engagement of a detent shoulder, represented herein as formed by the pin $h$, with a shoulder or projection at the outer end of an arm $g$ fixed upon a shaft $e$ upon which is also fixed an arm $f$ whose outer end normally lies in the path of movement of a tripping shoulder, represented in the drawings as a lateral pin $d$, carried by the toothed wheel $a$.

As the wheel $a$ continues to revolve, the wheel $c$ is maintained stationary under the action of the detent arm $g$ until the pin $d$ reaches the position indicated in Fig. 1, when it engages the free end of the lifting lever $f$ and throws the same outwardly, together with the detent member $g$, which latter releases the pin $h$ and permits the wheel $c$ under the action of the spring $i$, which has been in the meantime wound up by the movement of the wheel $a$ relative to the wheel $c$, to partially or wholly overtake the wheel $a$, when the return by gravity of the lifting and detent arms $f$ and $g$ to initial position enables the latter to again perform its normal function in detaining the driven member $c$ under the impulse of the driving member $a$.

The frame of the instrument is provided at one side of the shaft $b$ with a shaft $m$ to which is fixed the peripherally-numbered dial-plate or disk $o$ constituting the indicating device and a toothed wheel $l$ having a series of primary teeth spaced apart to correspond with the graduations formed by the peripheral numbers of the disk $o$ and a secondary series of teeth intermediate the same, as indicated in Fig. 1. The wheel $c$ is provided near the periphery of its rear face with a lateral pin $k$ adapted to engage successively the primary teeth of the wheel $l$ and with an adjacent notch adapted to be entered by the succeeding tooth of the secondary series, whereby each rotation of the wheel $c$ imparts to the wheel $l$ a partial rotation equivalent to the distance between the teeth of each series and presents a tooth in a proper position for engagement with the pin $k$ for each succeeding rotation of the wheel $c$, as indicated in dotted lines at the left in Fig. 1.

In practice, the wheel $c$ is provided with an operative portion (such as the pin $k$ and notch $n$) for each detent pin $h$ which it may carry, so that each release of the detent pin by the arm $g$ to enable the wheel $c$ to follow the wheel $a$ in performing a whole or partial rotation will produce a corresponding movement of the wheel $l$ and dial $o$; but I prefer to employ only a single detent pin $h$ and operative portion $k$, $n$, as represented herein. In Fig. 1, the pin $k$ and notch $n$ are indicated in dotted lines in the initial positions in which they remain until the arm $g$ is disengaged from the pin $h$ upon the wheel $c$, and such parts are indicated at $k'$ and $n'$ in the positions which they assume when thrown into engagement with the teeth of the wheel $l$ under the action of the spring $i$. It is to be understood, however, that the present improvement is not limited to any particular type of driving connection between the members $c$ and $l$, as any known expedient may obviously be used for such purpose.

It is evidently unnecessary that the spring $i$ be sufficiently strong and resilient to impart a complete rotation to the disk $c$ in respect of the disk $a$ so as to enable it to wholly overtake the latter, its primary function being to produce a rapid movement of the pin $k$ past its respective tooth of the wheel $l$, in order that the circular movement of the disk $o$ between its graduations may be practically instantaneous. The pin $k$ and notch $l$ are therefore preferably disposed as close as practicable to their point of operation consistent with the overcoming to the requisite degree of the inertia of the wheel $c$ under the action of the spring $i$ for production of the desired circumferential speed of the pin $k$ and notch $n$ at their point of operation.

Having thus described the invention, what I claim herein is,—

1. A counting mechanism for meters and similar instruments comprising a driving member, a relatively-movable driven member, a resilient connection intermediate said members, a detent pin or shoulder carried by said driven member, a tripping pin or shoulder carried by said driving member, and rigidly-connected vibrating detent and tripping arms adapted to engage respectively said detent pin or shoulder and said tripping pin or shoulder.

2. A counting mechanism for meters and similar instruments comprising a rotary driving member provided with a lateral tripping pin, a driven member mounted concentrically therewith for independent rotary movement in respect thereof, and provided with a lateral detent pin, a torsional spring having its ends connected respectively with said detent pin of the driven member and the driving member, a rock-shaft, and two vibrating arms fixed thereon, the one having a detaining shoulder adapted to engage the lateral pin of the driven member and the other normally lying in the path of movement of the tripping pin of said driving member by which the same is periodically engaged to lift the detaining arm from engagement with the lateral pin of the driven member.

3. A counting mechanism for meters and similar instruments comprising the rotary driving wheel $a$ provided with a laterally projecting hub and an oppositely projecting lateral tripping pin $d$, the shaft $b$ upon which said wheel is mounted, the driven wheel $c$ loosely mounted upon said shaft $b$ and provided with a lateral detent pin upon the face nearest the driving wheel and the lateral gear tooth or pin $k$ upon the opposite face, the spiral spring $i$ having one end connected with the detent pin $h$ and the other end attached to the hub of the driving wheel, the rock-shaft $e$, the arm $f$ fixed upon said rock-shaft and lying in the path of movement of the tripping pin $d$, the detaining arm $g$ also fixed to the rock-shaft $e$ and having a shoulder normally engaging the detent pin $h$, a peripherally toothed indicator-wheel $l$ disposed in operative relation with the gear tooth or stud $k$ upon the driven wheel $c$, and a dial-plate or disk $o$ fixed to and rotatable with said indicator-wheel $l$.

In witness whereof, I subscribe my signature, in presence of two witnesses.

HERMANN ARON.

Witnesses:
HENRY HASPER,
WOLDEMAR HAUPT.